United States Patent
Kim et al.

(10) Patent No.: US 9,129,146 B2
(45) Date of Patent: Sep. 8, 2015

(54) METHOD OF TRANSFORMING STEREOSCOPIC IMAGE AND RECORDING MEDIUM STORING THE SAME

(71) Applicant: KNU University-Industry Cooperation Foundation, Chuncheon-si, Gangwon-do (KR)

(72) Inventors: Man Bae Kim, Chuncheon-si (KR); Jong In Gil, Chuncheon-si (KR)

(73) Assignee: KNU UNIVERSITY-INDUSTRY COOPERATION FOUNDATION, Chuncheon-Si, Gangwon-Do (KR)

( * ) Notice: Subject to any disclaimer, the term of this patent is extended or adjusted under 35 U.S.C. 154(b) by 20 days.

(21) Appl. No.: 14/015,299

(22) Filed: Aug. 30, 2013

(65) Prior Publication Data

US 2014/0064608 A1    Mar. 6, 2014

(30) Foreign Application Priority Data

Sep. 3, 2012    (KR) .................. 10-2012-0097270

(51) Int. Cl.
G06K 9/00    (2006.01)
G06T 5/00    (2006.01)
G06T 7/00    (2006.01)
H04N 13/00    (2006.01)

(52) U.S. Cl.
CPC ............ G06K 9/00201 (2013.01); G06T 5/005 (2013.01); G06T 7/0075 (2013.01); H04N 13/0022 (2013.01); G06T 2207/20192 (2013.01)

(58) Field of Classification Search
None
See application file for complete search history.

(56) References Cited

U.S. PATENT DOCUMENTS

| 8,704,875 | B2* | 4/2014 | Cheng et al. | 348/43 |
| 2011/0032341 | A1* | 2/2011 | Ignatov et al. | 348/51 |
| 2012/0274629 | A1* | 11/2012 | Baek | 345/419 |
| 2013/0187910 | A1* | 7/2013 | Raymond et al. | 345/419 |

* cited by examiner

*Primary Examiner* — Daniel Mariam
(74) *Attorney, Agent, or Firm* — Hazuki International, LLC (57) ABSTRACT

Disclosed is a method of transforming a stereoscopic image, including: extracting a depth map from a left-eye image and a right-eye image of the stereoscopic image as the left-eye image and the right-eye image are input; obtaining transformation information from the depth map; and transforming red, green, and blue (RGB) values of the stereoscopic image based on the transformation information. It is possible to provide a stereoscopic image having an improved three-dimensional effect, compared to an existing stereoscopic image.

13 Claims, 5 Drawing Sheets
(3 of 5 Drawing Sheet(s) Filed in Color)

METHOD OF TRANSFORMING STEREOSCOPIC IMAGE AND RECORDING MEDIUM STORING THE SAME

CROSS REFERENCES TO RELATED APPLICATIONS

The present invention contains subject matter related to Korean Patent Application No. 10-2012-0097270, filed in the Korean Patent Office on Sep. 3, 2012, the entire contents of which are incorporated herein by reference.

BACKGROUND OF THE INVENTION

1. Field of the Invention

The present invention relates to a method of transforming a stereoscopic image, and more particularly, to a method of transforming a stereoscopic image for improving a three-dimensional effect of the stereoscopic image.

2. Description of Related Art

Recently, as a display technology advances, a user can easily enjoy stereoscopic image contents using a three-dimensional television set at home or a theater. Nevertheless, demands for the more improved three-dimensional effect increase continuously. For such demands, studies have been made for the more improved three-dimensional effect by utilizing a variety of stereoscopic perception factors.

Methods of creating a stereoscopic image may be classified into two types. As a first type, left-eye and right-eye stereoscopic images are directly obtained from a three-dimensional camera. As a second type, the left-eye and right-eye images are created from a color image and a depth map obtained using a single color camera and a single depth camera.

If the depth map is obtained from the left-eye image and the right-eye image obtained through the first type, the first type can be implemented in a similar way to that of the second type.

When the left-eye image and the right-eye image are directly obtained from the three-dimensional camera, both images are not corrected. Therefore, it is difficult to adjust the three-dimensional effect.

Meanwhile, a depth sensor is widely employed in the field of computer vision or image processings.

Unlike an RGB sensor, the depth sensor measures a distance between the sensor and a subject and stores the depth value as a depth image. For example, in the case of 8-bit depth sensor, the depth map has a depth value within a range of [0, 255] for the distance between the sensor and the subject.

SUMMARY OF THE INVENTION

In view of the aforementioned problems, the present invention provides a method of transforming a stereoscopic image for improving a three-dimensional effect of the stereoscopic image.

According to an aspect of the invention, there is provided a method of transforming a stereoscopic image, including: extracting a depth map from a left-eye image and a right-eye image of the stereoscopic image as the left-eye image and the right-eye image are input; obtaining transformation information from the depth map; and transforming red, green, and blue (RGB) values of the stereoscopic image based on the transformation information.

The extracting the depth map may include extracting the depth map from the left-eye image and the right-eye image using a stereo matching scheme.

The extracting the depth map from the left-eye image and the right-eye image using the stereo matching scheme may include searching edges in the left-eye image and the right-eye image to obtain a matching point of each edge, obtaining an edge disparity from the matching point, obtaining a saliency map from RGB images of the left-eye image and the right-eye image, dividing the left-eye image and the right-eye image into predetermined regions using the saliency map, obtaining a disparity of the divided region using the edge disparity, and correcting the disparity of the divided region.

The transformation information may be obtained from a high frequency component of the depth map.

The transformation information may be obtained based on an equation $\Delta D = D - G \otimes D$, where "$\Delta D$" denotes the transformation information, "$D$" denotes an input depth map, "$G$" denotes a lowpass filter, and $\otimes$ denotes a convolution operator.

The RGB values of the stereoscopic image may be transformed using a contrast transformation scheme or a background darkening scheme.

According to another aspect of the invention, there is provided a method of transforming a stereoscopic image, including: obtaining transformation information from a depth map of a stereoscopic image including a left-eye image and a right-eye image; and transforming an RGB value of the stereoscopic image using the transformation information.

BRIEF DESCRIPTION OF THE DRAWINGS

The patent or application file contains at least one drawing and photograph executed in color. Copies of this patent or patent application publication with color drawings and photographs will be provided by the Office upon request and payment of the necessary fee. The foregoing and additional features and characteristics of this disclosure will become more apparent from the following detailed description considered with reference to the accompanying drawings, wherein.

The foregoing and additional features and characteristics of this disclosure will become more apparent from the following detailed description considered with reference to the accompanying drawings, wherein.

DETAILED DESCRIPTION OF THE INVENTION

Hereinafter, embodiments of the invention will be described in detail with reference to the accompanying drawings. It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure. The terminology used herein is only for the purpose of describing particular embodiments and is not intended to limit the invention. As used herein, the singular forms "a", "an," and "the" may be intended to include the plural forms as well, unless the context clearly indicates otherwise. It is further to be noted that, as used herein, the terms "comprises", "comprising", "include", and "including" indicate the presence of stated features, integers, steps, operations, units, and/or components, but do not preclude the presence or addition of one or more other features, integers, steps, operations, units, and/or components, and/or combination thereof.

According to the present invention, a stereoscopic image transformation device is a subject for implementing a method of transforming a stereoscopic image. Alternatively, the subject for implementing the method may be a controller or a processor configured to collectively control the stereoscopic image transformation device. That is, the method of transforming a stereoscopic image according to the present invention may be a type of software algorithm. The software may be executed by a stereoscopic image transformation device, a controller, or a processor.

Figure 1:
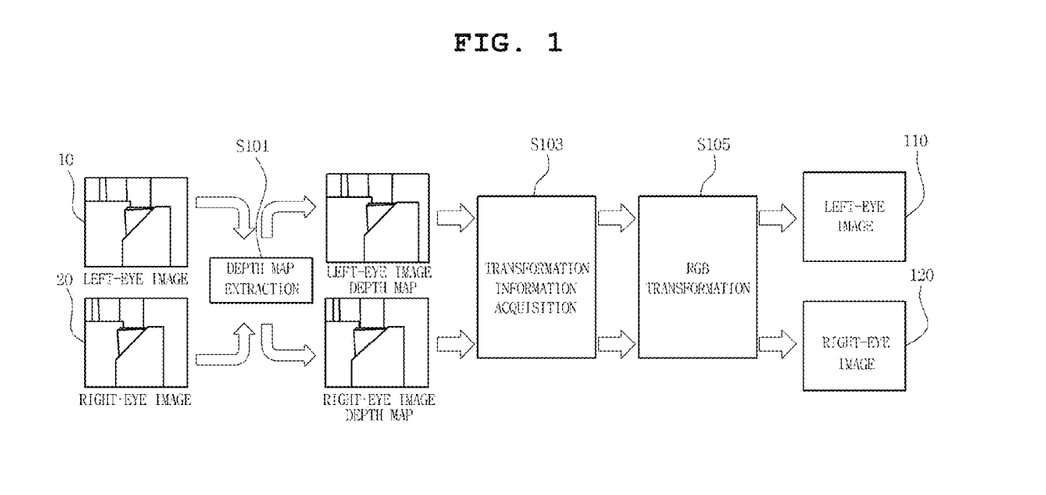
FIG. 1 is a flowchart illustrating a method of transforming a stereoscopic image according to an embodiment of the invention.

FIG. 1 is a flowchart illustrating a method of transforming a stereoscopic image according to an embodiment of the invention.

Referring to FIG. 1, input data contains a left-eye image 10 and a right-eye image 20. In step S101 (depth map extraction step), a depth map of the left-eye image and the right-eye image is extracted from the left-eye image 10 and the right-eye image 20 of the input stereoscopic image based on a stereo matching scheme.

In step S103 (transformation information acquisition step), transformation information is obtained from the extracted depth map of the left-eye image and the right-eye image. The transformation information according to an embodiment of the invention may be obtained from a high frequency component of the depth map.

Finally, in RGB transformation step, red, green, and blue (RGB) values of the stereoscopic image are transformed based on the transformation information.

According to the present invention, it is possible to implement an improved three-dimensional effect using the stereoscopic image of the left-eye image 110 and the right-eye image 120 transformed in this manner.

Alternatively, the method of transforming a stereoscopic image may be implemented by omitting the depth map extraction step (S101). For example, if a depth camera is employed, the transformation information may be extracted directly from a depth map obtained from the depth camera. In the case of 2D-to-3D transformation, a depth map of a two-dimensional image is finally obtained. Therefore, it is possible to directly obtain transformation information without the depth map extraction step (S101).

Now, each step in the method of transforming a stereoscopic image according to an embodiment of the invention will be described in detail. First, depth map extraction step (S101) will be described.

According to the present embodiment, the depth map is extracted based on a stereo matching scheme.

Since the process of obtaining the depth map is similar between the left-eye image and the right-eye image, the following description will be made by focusing on the left-eye image.

The process of extracting the depth map can be classified into four parts. First, edges are searched from the left-eye image and the right-eye image, and matching points between the left-eye image and the right-eye image are obtained. Then, an edge disparity is obtained based on the matching points. Second, a saliency map is obtained from the RGB images, and the image is divided into several regions based on the saliency map. Then, a disparity in the divided region is obtained based on the edge disparity. Third, since there still is a region where the disparity is not allocated, it is necessary to provide a process of obtaining a disparity in this region. Finally, it is necessary to emphasize a boundary of an object in the depth map and suppress a change inside the object. For this purpose, the depth map is corrected.

Now, a method of predicting the edge disparity according to the present invention will be described in detail.

In order to obtain the edge disparity, overall edges in the left-eye image are searched to match those of the right-eye image. First, edges are detected using an edge operator, and the edge map is binarized into "0" or "255" by applying a threshold value.

Here, it is assumed that $I^L$ denotes the left-eye image, $I^R$ denotes the right-eye image, $E^L$ denotes the edge map of the left-eye image, $E^R$ denotes the edge map of the right-eye image, and $d_{max}$ denotes a maximum disparity between both images.

The right-eye image $I^R$ and the edge map $E^R$ of the right-eye image are shifted by one pixel in a horizontal direction until $s=[-d_{max}, d_{max}]$. If the edge is overlapped in the same coordinate position in each shift operation, the corresponding pixel is designated as an overlapped edge.

Figure 2:
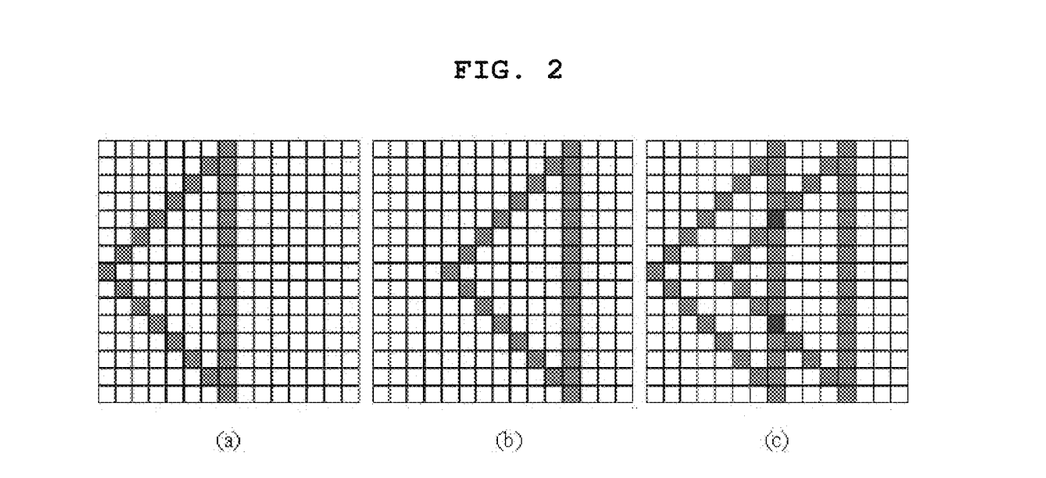
FIGS. 2A to 2C are diagrams illustrating an edge disparity according to an embodiment of the invention.

FIGS. 2A to 2C are diagrams illustrating the edge disparity according to an embodiment of the invention. Specifically, FIG. 2A illustrates the edge map $E^L$ of the left-eye image, FIG. 2B illustrates the edge map $E^R$ of the right-eye image, and FIG. 2C illustrates the overlapped edge indicated by a red color.

In each shift operation, a plurality of overlapped edge pixels may exist for a single edge. A suitable disparity can be obtained by searching an optimal matching edge from these overlapped edges. For this purpose, a mean squared error (MSE) is obtained from the corresponding edge using a grayscale image. The MSE is computed based on Equation 1 as follows:

$$MSE(i,j) = \frac{1}{MN} \sum_{m=-\frac{M}{2}}^{\frac{M}{2}} \sum_{n=-\frac{N}{2}}^{\frac{N}{2}} (I^L_{i+m,j+n} - I^R_{i+m,j+n})^2, \quad \text{[Equation 1]}$$

where "M×N" denotes a block size.

The MSE is obtained for overall overlapped pixels by shifting the edge map $E^R$ of the right-eye image. Then, a pixel having the smallest MSE value is selected as a matching pixel.

FIGS. 3A to 3E are diagrams illustrating an edge map shift operation according to an embodiment of the invention.

Figure 3:
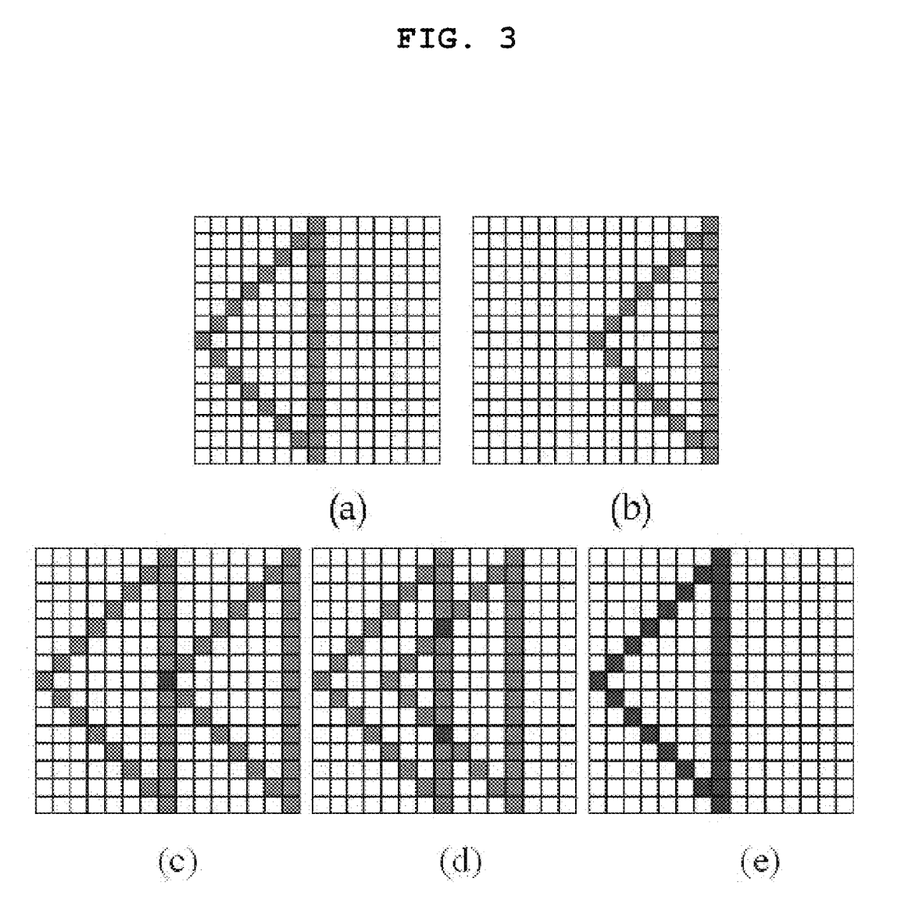
FIGS. 3A to 3E are diagrams illustrating a shift operation of the edge map according to an embodiment of the invention.

In a 15×15 pixel block of FIGS. 3A to 3E, the edge is indicated by a blue pixel, and the overlapped edge is indicated by a red pixel. FIG. 3A is the edge map $E^L$ of the left-eye image. FIG. 3B is the edge map $E^R$ of the right-eye image. FIGS. 3C to 3E are explanatory diagrams illustrating a shift operation of the edge map $E^R$. In FIG. 3C, a shift distance "s" is set to zero (s=0). In FIG. 3D, the shift distance "s" is set to "3" (s=3). In FIG. 3E, the shift distance "s" is set to "7" (s=7).

In FIGS. 3A to 3E, the edge map $E^R$ of the left-eye image is shifted while the edge map $E^L$ of the left-eye image is fixed.

In this example, as the edge map $E^R$ is shifted, the overlapped edges are sequentially generated as illustrated in FIGS. 3C to 3E.

If the MSE of the block is computed from FIGS. 3C to 3E, it is recognized that the MSE has the smallest value in FIG. 3E. If a matching pixel is selected, a shift distance "s" of the edge map $E^R$ corresponds to a disparity of the corresponding pixel. In FIGS. 3A to 3E, the disparity of the pixel is the shift distance "s=7".

Figure 4:
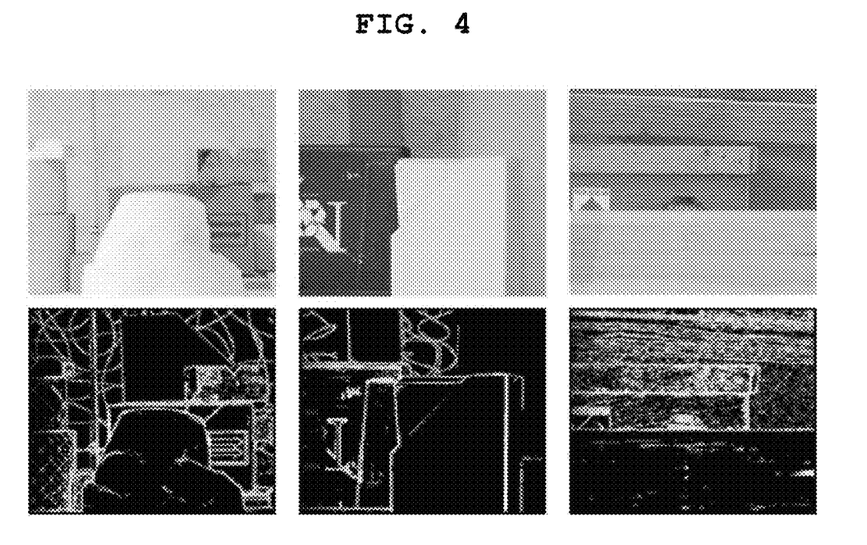
FIG. 4 is a diagram illustrating an input left-eye image and an edge disparity according to an embodiment of the invention.

FIG. 4 is a diagram illustrating the input left-eye image and the edge disparity according to an embodiment of the invention. That is, FIG. 4 illustrates an image obtained by transforming the disparity of the edge obtained from the image into a depth.

Next, disparity allocation in the region will be described.

In order to allocate the disparity to the internal region of the edge, first, an image is divided into regions. For dividing the image, a saliency map is created from the input image, and the image is divided into regions based on the saliency map. In addition, a disparity is allocated to each divided region from the obtained edge disparity.

In order to create the saliency map, first, the RGB image is transformed to a Lab color space. Advantageously, the chrominance in the Lab color space is nearly uniform along the Euclidean distance.

A lowpass filter is applied to the factors L, a, and b using Equation 2 as follows:

$$\hat{L} = G \otimes L$$
$$\hat{a} = G \otimes a$$
$$\hat{b} = G \otimes b, \qquad \text{[Equation 2]}$$

where "G" denotes a lowpass filter, and "$\otimes$" denotes a convolution operator.

Based on the following Equation 3, the saliency map SM is created from the Lab image.

$$SM_{x,y} = \sqrt{(\hat{L}_{x,y} - \bar{L})^2 + (\hat{a}_{x,y} - \bar{a})^2 + (\hat{b}_{x,y} - \bar{b})^2}, \qquad \text{[Equation 3]}$$

where "x" and "y" are coordinate values of a pixel, and $\bar{L}$, $\bar{a}$, and $\bar{b}$ are average values of the dimensions "L", "a", and "b," respectively, across the entire image.

Figure 5:
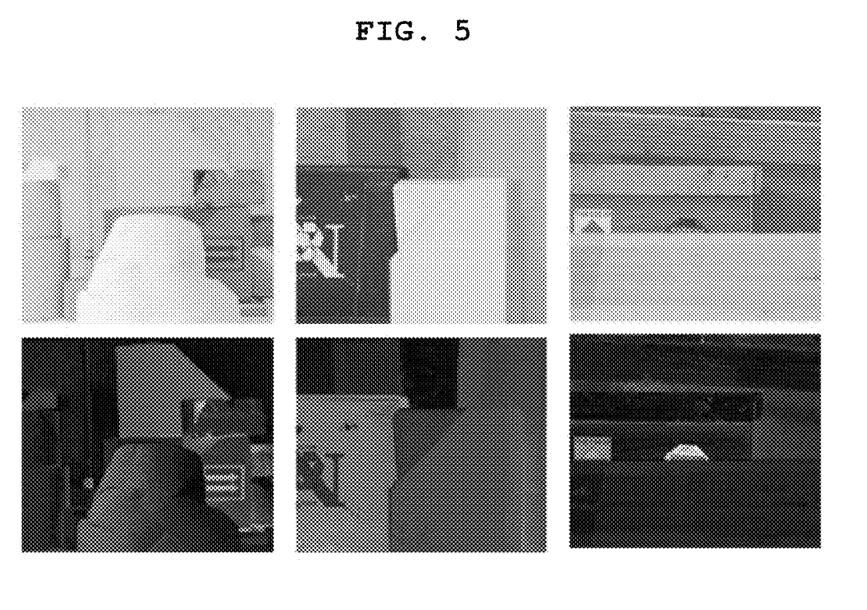
FIG. 5 is a diagram illustrating an input left-eye image and a saliency map according to an embodiment of the invention.

FIG. 5 is a diagram illustrating the saliency map and the input left-eye image according to an embodiment of the invention. That is, FIG. 5 illustrates a saliency map depending on an input image.

In FIG. 5, the input left-eye images are illustrated in the upper column, and the saliency maps for the input left-eye images are illustrated in the lower column.

The maximum value $SM_{max}$ and the minimum value $SM_{min}$ of the saliency map SM are obtained, and a range of the grayscale values of the saliency map $\tau = [SM_{min}, SM_{max}]$ is stored. The range of $SM_i$ is set with a constant interval "I" from the minimum value $SM_{min}$. This can be expressed as Equation 4 as follows:

$$SM_1 = [SM_{min}, S_{min} + l]$$
$$SM_2 = [SM_{min} + l, SM_{min} + 2l]$$
$$\vdots$$
$$SM_N = [SM_{max} - l, SM_{max}] \qquad \text{[Equation 4]}$$

In this case, it is necessary to allocate a disparity to each region $SM_i$. For this purpose, the obtained disparity of the edge pixel is utilized.

First, disparities existing in the region $SM_i$ are searched from the disparity map. In addition, an average of the searched disparities is computed, and the resulting average disparity is allocated to the region $SM_i$.

Otherwise, if there is no edge in the region, it is difficult to obtain a disparity of that region. According to the present invention, this region is referred to as a "hole," and this hole is filled based on disparities of neighboring regions.

The hole pixel may filled by using a disparity value of the closest pixel or an average of the disparities of the neighboring pixels.

Figure 6:
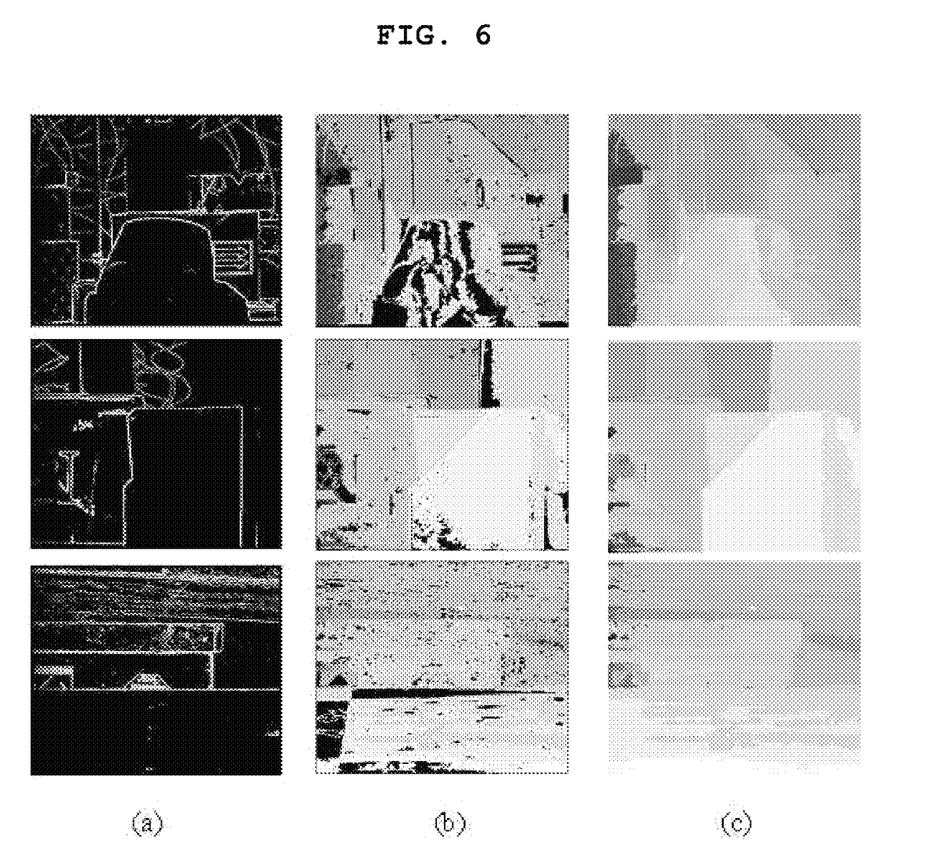
FIGS. 6A to 6C are depth maps obtained by performing hole filling according to an embodiment of the invention.

FIGS. 6A to 6C are depth maps illustrating a result of the hole filling according to an embodiment of the invention. That is, FIGS. 6A to 6C illustrate depth maps of initial images and depth maps subjected to the hole filling. Specifically, FIG. 6A illustrates an edge depth map, FIG. 6B illustrates an image depth map, and FIG. 6C illustrates a depth map subjected to the hole filling.

As the depth map subjected to the hole filling is obtained, a process of correcting the edge disparity is finally performed in order to emphasize a boundary of the object.

For this purpose, such correction may be performed by updating a depth value of the current pixel with an average of the depth values inside the M×N blocks for overall pixels of the RGB image. In this correction method, a blurring may occur, and the edge disparity may become obscured disadvantageously.

Alternatively, such correction may be performed by selecting only a pixel similar to the center pixel in the block and excluding other dissimilar pixels based on the RGB information. In this method, it is possible to more accurately obtain the edge disparity.

For this purpose, the grayscale differences between the center pixel and other pixels are obtained for overall pixels in the block. In addition, a median of the differences is set as a threshold value $T_1$.

$$T_1 = \text{median}(|I_c - I_{m,n}|) \qquad \text{[Equation 5]}$$
$$M(m, n) = \begin{cases} 255 & \text{if } |I_c - I_{m,n}| \leq T_1 \\ 0 & \text{otherwise} \end{cases}$$

In Equation 5, "$I_c$" denotes the center pixel value, and "$I_{m,n}$" denotes each pixel value in the block.

Then, the depth map is updated with the average of the pixels having the differences $|I_{m,n} - I_c|$ greater than the threshold value $T_1$. That is, the depth map is updated with the average of the depth values "M=255."

Through this process, it is possible to emphasize the edge while a noise of the object is removed.

Figure 7:
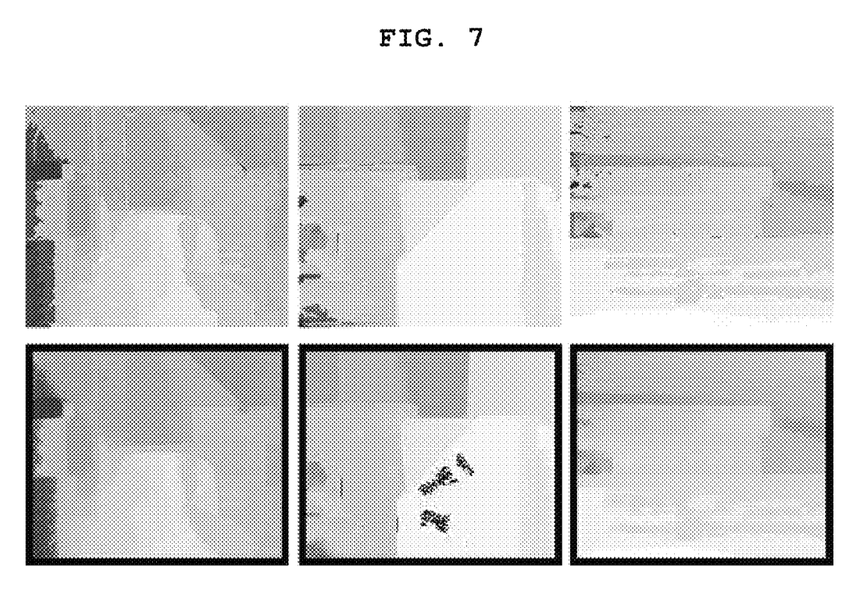
FIG. 7 is a diagram illustrating a result of depth map correction according to an embodiment of the invention.

FIG. 7 is a diagram illustrating a result of the depth map correction according to an embodiment of the invention. In FIG. 7, the images before the depth map correction are illustrated in the upper column, and the images subjected to the depth correction are illustrated in the lower column.

As described above, if the depth map is obtained through the stereo matching scheme, it is possible to obtain transformation information by applying a high frequency component extracting scheme to this depth map.

According to the present invention, it is possible to derive transformation information $\Delta D$ of the high frequency component of the depth map by computing a difference between an input depth map and a depth map subjected to a lowpass filtering. The transformation information $\Delta D$ may be obtained based on Equation 6 as follows:

$$\Delta D = D - G \otimes D, \qquad \text{[Equation 6]}$$

where "D" denotes an input depth map, "G" denotes a low-pass filter, and "⊗" denotes a convolution operator.

The transformation information ΔD obtained from Equation 6 has a relatively greater value in a discontinuous region such as an edge and has a relatively smaller value in a continuous region such as an internal region. In addition, the sign is used as information for determining a region having a greater depth or a smaller depth.

The aforementioned transformation information ΔD has a range of [−255, 255]. By normalizing this range to [−1, 1], normalized transformation information $\Delta D_N$ is obtained. The RGB information of the left-eye image and the right-eye image may be transformed using the normalized transformation information $\Delta D_N$. As such a transformation scheme, there are known a contrast transformation scheme and a background darkening scheme.

First, the contrast transformation scheme will be described.

In the contrast transformation scheme, if there is a neighboring pixel having a difference of the depth value, it is possible to change the RGB value of the pixel by changing the normalized transformation information ΔD.

In this contrast transformation scheme, the background part is more darkened, and the foreground is more brightened. Therefore, a depth effect is improved.

By directly adding the normalized transformation information $\Delta D_N$ to the input image I (I∈R, G, B) as described below in Equation 7, a new image R'G'B' is obtained as follows:

$$R'=R+\lambda \cdot \Delta D_N$$
$$G'=G+\lambda \cdot \Delta D_N$$
$$B'=B+\lambda \cdot \Delta D_N \quad \text{[Equation 7]}$$

where λ denotes a positive real number as a weight factor defined by a user. As the weighting factor λ increases, the contrast increases. The RGB value changes depending on a sign. However, it is difficult to say that a high contrast image is an excellent image. As the weighting factor λ increases, a possibility of image quality degradation increases. Therefore, it is necessary to suitably set the weighting factor λ.

Next, a background darkening scheme will be described.

Typically, out of a foreground object and a background, the background has a relatively smaller depth value. In this case, a three-dimensional depth effect is improved by darkening the background pixel.

The background darkening scheme is applicable to an image having an insignificant color difference between an object and a background by darkening the background region in the vicinity of the edge. This scheme can be expressed as Equation 8 as follows:

$$R'=R+\lambda \cdot \Delta D_N^-$$
$$G'=G+\lambda \cdot \Delta D_N^-$$
$$B'=B+\lambda \cdot \Delta D_N^- \quad \text{[Equation 8]}$$

where "$\Delta D_N^-$" is a negative value of $\Delta D_N$ and has a positive value if λ>0.

According to the present invention, it is possible to provide a stereoscopic image having an improved three-dimensional effect when a user watches a three-dimensional display by providing a stereoscopic image including left-eye and right-eye images consisting of R', G', and B' obtained based on Equations 7 and 8.

The method of transforming a stereoscopic image according to an embodiment of the invention may be implemented in the form of computer code stored on a computer-readable recording medium. Here, the computer-readable recording medium can be any kind of recording device that stores computer system-readable data, such as ROM, RAM, CD-ROM, magnetic tape, floppy discs, optical data storage devices, etc., or carrier waves (e.g., a transmission over the Internet). Also the computer-readable recording medium may be distributed among computer systems connected via a network, so that the code corresponding to the present invention can be stored and executed in a decentralized manner.

According to the present invention, it is possible to provide a stereoscopic image having an improved three-dimensional effect, compared to an existing stereoscopic image.

In addition, the present invention may be applicable to improvement of a three-dimensional effect of the three-dimensional contents that have been distributed already. Furthermore, if the method of transforming the stereoscopic image according to the present invention is applied to a depth map obtained in the process of automatic or manual 2D-to-3D conversion, it is possible to improve a three-dimensional effect.

Moreover, the present invention may be directly applied to a depth camera, which is widely developed in recent years.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of transforming a stereoscopic image, comprising:
    extracting a depth map from red, green, and blue (RGB) images of a left-eye image and a right-eye image of the stereoscopic image as the left-eye image and the right-eye image are input;
    obtaining transformation information from the depth map; and
    transforming RGB values of the RGB images of a left-eye image and a right-eye image of the stereoscopic image using a contrast transformation scheme or a background darkening scheme,
    wherein the method is performed using one or more processors.

2. The method according to claim 1, wherein the extracting the depth map includes extracting the depth map from the left-eye image and the right-eye image using a stereo matching scheme.

3. The method according to claim 2, wherein the extracting the depth map from the left-eye image and the right-eye image using the stereo matching scheme comprises
    searching edges in the left-eye image and the right-eye image to obtain a matching point of each edge,
    obtaining an edge disparity from the matching point,
    obtaining a saliency map from RGB images of the left-eye image and the right-eye image,
    dividing the left-eye image and the right-eye image into predetermined regions using the saliency map,
    obtaining a disparity of the divided region using the edge disparity, and correcting the disparity of the divided region.

4. The method according to claim 1, wherein the transformation information is obtained from a high frequency component of the depth map.

5. The method according to claim 4, wherein the transformation information is obtained based on an equation:

$$\Delta D = D - G \otimes D,$$

where "ΔD" denotes the transformation information, "D" denotes an input depth map, "G" denotes a low pass filter, and ⊗ denotes a convolution operator.

6. A method of transforming a stereoscopic image, comprising:
   obtaining transformation information from a depth map from red, green, and blue (RGB) images of a stereoscopic image including a left-eye image and a right-eye image; and
   transforming RGB values of the RGB images of the stereoscopic image using a contrast transformation scheme or a background darkening scheme,
   wherein the method is performed using one or more processors.

7. The method according to claim 6, wherein the transformation information is obtained from a high frequency component of the depth map.

8. The method according to claim 7, wherein the transformation information is obtained based on an equation $$\Delta D = D - G \otimes D,$$

where "ΔD" denotes the transformation information, "D" denotes an input depth map, "G" denotes a low pass filter, and ⊗ denotes a convolution operator.

9. A non-transitory computer readable storage medium having stored thereon a set of computer-executable instructions for causing the computer to execute steps comprising:
   extracting a depth map from red, green, and blue (RGB) images of a left-eye image and a right-eye image of the stereoscopic image as the left-eye image and the right-eye image are input;
   obtaining transformation information from the depth map; and
   transforming RGB values of the RGB images of a left-eye image and a right-eye image of the stereoscopic image using a contrast transformation scheme or a background darkening scheme.

10. The non-transitory computer readable storage medium according to claim 9, wherein the extracting the depth map includes extracting the depth map from the left-eye image and the right-eye image using a stereo matching scheme.

11. The non-transitory computer readable storage medium according to claim 10, wherein the extracting the depth map from the left-eye image and the right-eye image using the stereo matching scheme comprising:
   searching edges in the left-eye image and the right-eye image to obtain a matching point of each edge,
   obtaining an edge disparity from the matching point,
   obtaining a saliency map from RGB images of the left-eye image and the right-eye image,
   dividing the left-eye image and the right-eye image into predetermined regions using the saliency map,
   obtaining a disparity of the divided region using the edge disparity, and
   correcting the disparity of the divided region.

12. The non-transitory computer readable storage medium according to claim 9, wherein the transformation information is obtained from a high frequency component of the depth map.

13. The non-transitory computer readable storage medium according to claim 12, wherein the transformation information is obtained based on an equation:

$$\Delta D = D - G \otimes D,$$

where "ΔD" denotes the transformation information, "D" denotes an input depth map, "G" denotes a low pass filter, and ⊗ denotes a convolution operator.

* * * * *